United States Patent
Stein

(10) Patent No.: US 9,176,006 B2
(45) Date of Patent: Nov. 3, 2015

(54) DETECTION AND CLASSIFICATION OF LIGHT SOURCES USING A DIFFRACTION GRATING

(75) Inventor: Gideon Stein, Jerusalem (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 1096 days.

(21) Appl. No.: 12/352,871

(22) Filed: Jan. 13, 2009

(65) Prior Publication Data

US 2009/0182690 A1 Jul. 16, 2009

Related U.S. Application Data

(60) Provisional application No. 61/021,071, filed on Jan. 15, 2008.

(51) Int. Cl.
| | | |
|---|---|---|
| *G06F 15/18* | (2006.01) | |
| *G01J 1/42* | (2006.01) | |
| *G06N 99/00* | (2010.01) | |
| *G01J 1/04* | (2006.01) | |
| *G01J 3/02* | (2006.01) | |
| *G01J 3/18* | (2006.01) | |
| *G01J 3/28* | (2006.01) | |
| *G02B 5/04* | (2006.01) | |

(52) U.S. Cl.
CPC ............... *G01J 1/4228* (2013.01); *G01J 1/04* (2013.01); *G01J 1/0407* (2013.01); *G01J 3/02* (2013.01); *G01J 3/0205* (2013.01); *G01J 3/0208* (2013.01); *G01J 3/18* (2013.01); *G01J 3/28* (2013.01); *G01J 3/2803* (2013.01); *G06N 99/005* (2013.01); *G01J 2001/4247* (2013.01); *G02B 5/04* (2013.01)

(58) Field of Classification Search
USPC ............................................. 706/12
See application file for complete search history.

(56) References Cited

U.S. PATENT DOCUMENTS

| | | | | | |
|---|---|---|---|---|---|
| 1,913,719 | A | * | 6/1933 | Nauman | 352/48 |
| 3,731,543 | A | * | 5/1973 | Gates | 73/504.02 |
| 3,994,008 | A | * | 11/1976 | Land et al. | 396/544 |
| 5,717,487 | A | * | 2/1998 | Davies | 356/328 |

(Continued)

OTHER PUBLICATIONS

Lafuente-Arroyo, S. et al "Traffic Sign shape classification evaluation I: SVM using Distance to Borders" IEEE 2005. [Online] Downloaded Aug. 3, 2011. http://ieeexplore.ieee.org/stamp/stamp.jsp?tp=&arnumber=1505162.*

(Continued)

*Primary Examiner* — Ben Rifkin
(74) *Attorney, Agent, or Firm* — The Law Office of Michael E. Kondoudis

(57) ABSTRACT

A system mounted in a vehicle for classifying light sources. The system includes a lens and a spatial image sensor. The lens is adapted to provide an image of a light source on the spatial image sensor. A diffraction grating is disposed between the lens and the light source. The diffraction grating is adapted for providing a spectrum. A processor is configured for classifying the light source as belonging to a class selected from a plurality of classes of light sources expected to be found in the vicinity of the vehicle, wherein the spectrum is used for the classifying of the light source. Both the image and the spectrum may be used for classifying the light source or the spectrum is used for classifying the light source and the image is used for another driver assistance application.

19 Claims, 6 Drawing Sheets

(56) References Cited

U.S. PATENT DOCUMENTS

| | | | | |
|---|---|---|---|---|
| 5,930,066 | A | * | 7/1999 | Ishizuka et al. ............ 360/77.03 |
| 5,983,161 | A | * | 11/1999 | Lemelson et al. ............ 701/301 |
| 6,831,261 | B2 | * | 12/2004 | Schofield et al. ............ 250/205 |
| 7,092,088 | B2 | * | 8/2006 | Schau ............ 356/328 |
| 7,149,366 | B1 | * | 12/2006 | Sun ............ 382/284 |
| 2004/0252209 | A1 | * | 12/2004 | Loose ............ 348/255 |
| 2007/0217689 | A1 | * | 9/2007 | Yang et al. ............ 382/227 |

OTHER PUBLICATIONS

Serway and Jewett "PHysics for Scientists and Engineers 6$^{th}$ Edition Chapter 38: Diffraction Patterns and Polarization" Jul. 21, 2003. [Online] Downloaded Aug. 4, 2011 http://www.electron.rmutphysics.com/physics/charud/scibook/Physics-for-Scientists-and-Engineers-Serway-Beichne%206edr-4/38%20-%20Diffraction%20Patterns%20and%20Polarization.pdf.*

Spectrum Scientifice "Diffraction Grating Definitions" 2005 [Online] DOwnloaded Aug. 3, 2011. http://www.ssioptics.com/definitions.html.*

Lafuente-Arroyo, S et al ("Traffic Sign Classification Invariant to Rotiations Using Support Vector Machines" Intelligent Vision 2004. [Online] Downloadd Sep. 20, 2012 http://agamenon.tsc.uah.es/Investigacion/gram/publications/acivs04-lafuente.pdf.*

Space Computer Corporation ("Space Computer") "An Introduction to Hyperspectral Imaging Technology" 2007 [Online] Downloaded Dec. 10, 2013 https://www.spacecomputer.com/documents/Introduction_to_HSI_Technology.pdf.*

* cited by examiner

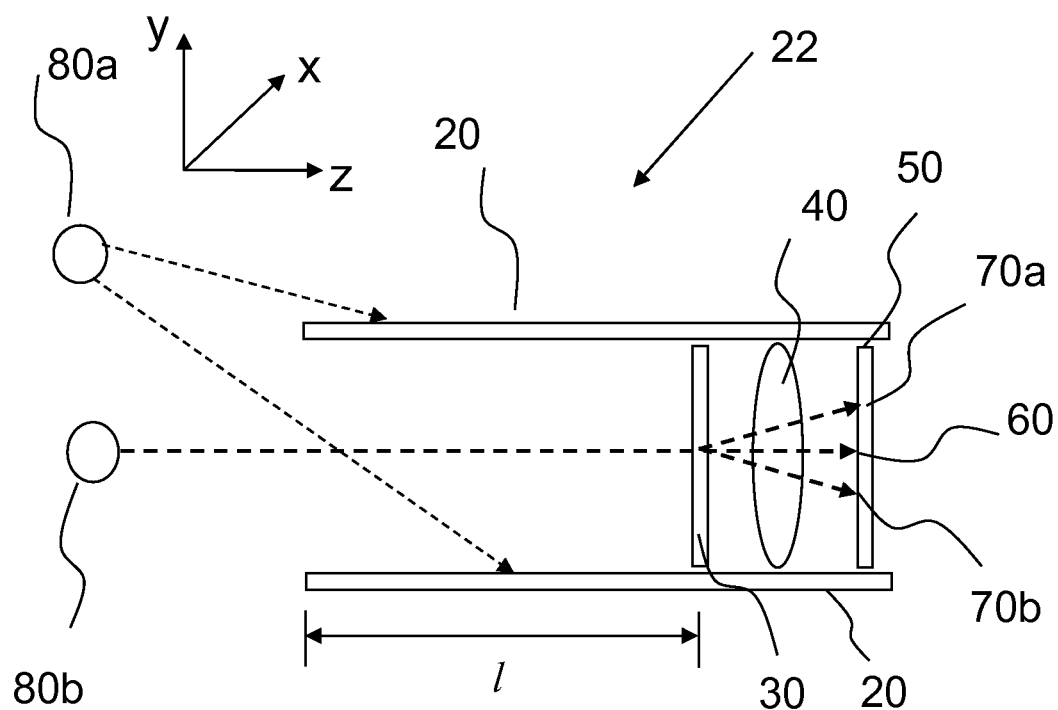
FIG. 3
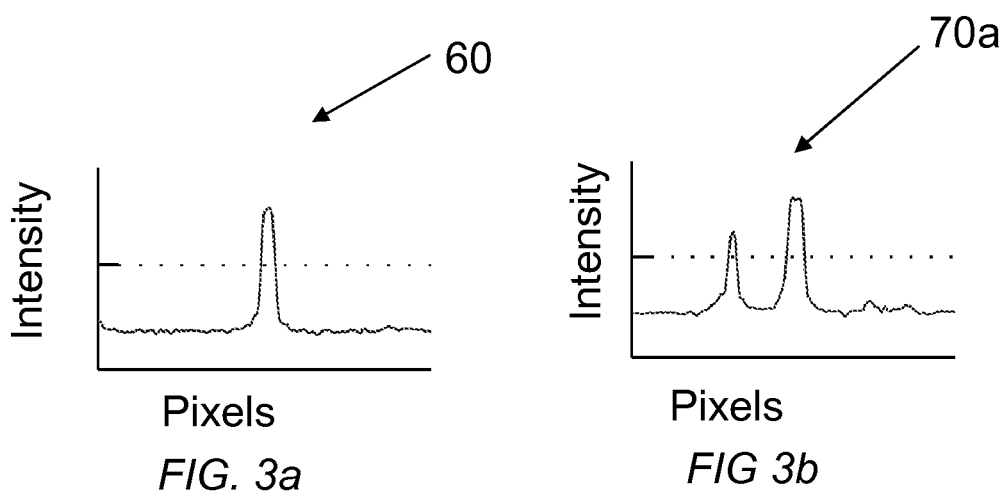
FIG. 3a
FIG 3b

DETECTION AND CLASSIFICATION OF LIGHT SOURCES USING A DIFFRACTION GRATING

CROSS REFERENCE TO RELATED APPLICATION

The present application benefits from U.S. provisional patent application No. 61/021,071 filed by the present inventor on Jan. 15, 2008, the disclosure of which is included herein by reference.

BACKGROUND

1. Technical Field

The present invention relates to a spectral image processor including a camera, a diffraction grating and a processor to detect and classify light sources in real time. Embodiments of the present invention are applicable to driver assistance systems (DAS). Specifically, oncoming vehicle headlights, leading vehicle taillights and streetlights, pedestrians, industrial lights and road signs are detected using a spectrum of the light sources. The spectral image processor allows for multiple DAS applications to be run simultaneously.

2. Description of Related Art

It is desirable for a vehicle control system to have the ability to classify various light sources including headlamps, taillights, street-lamps, house lights, and industrial lights. Schofield et al. (U.S. Pat. No. 6,831,261), disclose a headlight control device capable of identifying spectral characteristics of light sources using a camera equipped with one or more spectral filters. The spectral filters which provide the ability to distinguish red and white lights for example in the case of taillights and headlamps, also limit the use of the simultaneous use of the device of the same image frames for other driver assistance applications, such as lane departure warning and road sign detection.

Although white light of a halogen headlamp and a streetlight appear to both be white, their spectral composition is quite different. The low pressure sodium and high pressure sodium arc lamps used for street-lamps and industrial lights has a very distinct spectral pattern than that of a headlamp. Other white lights and fluorescent lights have different spectral characteristics. Since these 'white' light sources appear the same in a color camera with for instance red/green/blue color filters. (RGB) camera the different white light sources cannot be always be easily differentiated based on discrete color information.

Reference is now made to FIG. 1 and FIG. 2, which illustrate a vehicle control system 16 including a camera and image sensor 12 mounted in a vehicle 18 imaging a field of view in the forward or rear direction. Image sensor 12 typically delivers images in real time and the images are captured in a time series of image frames 15. An image processor 14 is used to process image frames 15 to perform one of a number of prior art vehicle controls. Prior art vehicle control systems include forward collision warning systems, lane departure warning systems, road sign detection, pedestrian detection and headlight control systems.

Headlight control is described in a pending US application US2007/0221822 of the present inventor. US application 2007/0221822 discloses image sensor 12 which captures image frames 15 consecutively in real time for headlight detection in conjunction with other driver control systems. The light source is typically one or more of headlights from an oncoming vehicle, taillights of a leading vehicle, street signs and/or traffic signs. The image spots are characterized in terms of position, intensity, size, and shape, but not by color, i.e. color filters are not used in the camera. Since color filters are not used in the camera, the image frames are available for sharing between multiple driver assistance system without sacrificing performance.

Collision Warning is disclosed in U.S. Pat. No. 7,113,867 by the present inventor. Time to collision is determined based on information from multiple images 15 captured in real time using camera 12 mounted in vehicle 18.

Lane Departure Warning (LDW) is disclosed in U.S. Pat. No. 7,151,996 by the present inventor. If a moving vehicle has inadvertently moved out of its lane of travel based on image information from images 15 from forward looking camera 12, then the system signals the driver accordingly.

Ego-motion estimation is disclosed in U.S. Pat. No. 6,704,621 by the present inventor. Image information is received from images 15 recorded as the vehicle moves along a roadway. The image information is processed to generate an ego-motion estimate of the vehicle, including the translation of the vehicle in the forward direction and the rotation. Vehicle control systems, such as disclosed in U.S. Pat. No. 6,831,261 which rely on changing exposure parameters (ie, aperture, exposure, magnification, etc) in order to detect headlights have a difficult time maintaining other control systems which rely on the same camera, e.g. Lane Departure Warning, Forward Collision Warning, etc. As a result of changing exposure parameters half or more of the (possibly critical) frames may not be available for the other control systems. This greatly affects performance of the other control systems.

Hence, since in the vehicle headlight control system as disclosed in U.S. Pat. No. 6,831,261 (or in any other disclosure where special control is required of camera settings including, aperture, exposure time and magnification), the same camera cannot be conveniently used for other simultaneously operable vehicle control systems such as lane departure warning or collision warning.

Additionally, the use of color cameras with infrared filters required to achieve good spectral separation reduces imaging sensitivity by a factor of six or more. A reduction in sensitivity by such a factor has an adverse impact on other vehicle control application such as LDW performance in dark scenes. The presence of an infrared filter also negates the use of the camera as a near infrared sensor for applications, such as pedestrian detection. Thus, headlight control systems which make strong use of color or spectral analysis with the use of color or absorptive or dichroic filters in the captured images (such as in U.S. Pat. No. 6,831,261) will tend not to be compatible with other applications without sacrificing performance.

Thus there is a need for, and it would be advantageous to have, a spectral processor adapted to identify various light sources by their spectral composition without adversely affecting use of the same image frames by other driver assistance applications.

Support vector machines (SVMs) are a set of related supervised learning methods used for classification and regression. Support vector machines (SVMs) belong to a family of generalized linear classifiers Support vector machines (SVMs) can also be considered a special case of Tikhonov regularization. A special property of SVMs is that they simultaneously minimize the empirical classification error and maximize the geometric margin; hence they are also known as maximum margin classifiers.

Viewing the input data as two sets of vectors in an n-dimensional space, an SVM will construct a separating hyperplane in that space, one which maximizes the "margin" between the two data sets. To calculate the margin, two parallel hyper-planes are constructed, one on each side of the separating one, which are "pushed up against" the two data sets. Intuitively, a good separation is achieved by the hyperplane that has the largest distance to the neighboring data points of both classes. The hope is that, the larger the margin or distance between these parallel hyper-planes, the better the generalization error of the classifier will be.

BRIEF SUMMARY

According to an aspect of the present invention, there is provided a system mounted in a vehicle. The system includes a lens and a spatial image sensor. The lens is adapted to provide an image of a light source on the spatial image sensor. A diffraction grating is disposed between the lens and the light source. The diffraction grating is adapted for providing a spectrum. A processor is configured for classifying the light source as belonging to a class selected from a plurality of classes of light sources expected to be found in the vicinity of the vehicle, wherein the spectrum is used for the classifying of the light source. The spectrum may be sensed by the spatial light sensor. The light source may be of streetlights, headlights, taillights and traffic signs. Typically, a hood enclosure is used to limit field of view so that an image provided by said lens does not superimpose said spectrum. Both the image and the spectrum may be used for classifying the light source or the spectrum is used for classifying the light source and the image is used for another driver assistance application. The diffraction grating is a holographic diffraction grating and/or a blazed diffraction grating. The blazing may be at a wavelength selected based on a known spectrum of a known light source. The lens and the diffraction grating are optionally manufactured as a single optical element. The spatial image sensor may have one or more programmable photosensitive gain regions. A second spatial image sensor may be provided to detect the spectrum. The (first) spatial image sensor and the second spatial image sensor may have different electronic gains.

According to another aspect of the present invention there is provided a method in a system including a camera equipped with a lens and a spatial image sensor. The lens provides an image of a light source on the spatial image sensor. A classifier is trained based on a multiple known spectra of light sources expected to be found in the vicinity of the system, e.g. road environment. After a trained classifier is produced, an image is detected of a light source, a spectrum of the light source is provided and located on the spatial image sensor. By applying the trained classifier, the light source is classified based on the spectrum as belonging to a class selected from a plurality of classes of light sources.

The classifying may be performed by applying rules based on at least one known spectrum of the light sources expected to be found in the vicinity of the system. The classifier may include a binary classifier and/or is based on support vector machines. The classifying may be based on both the spectrum and the image. The spectrum may be produced by either a diffraction grating or a prism.

According to yet another aspect of the present invention, there is provided a system including a lens and a spatial image sensor. The lens provides an image of a light source on the spatial image sensor. A diffraction grating is disposed between the lens and the light source. The diffraction grating is adapted for providing a spectrum. A processor is configured for classifying the light source as belonging to a class selected from a plurality of classes of light sources, wherein the spectrum is used for the classifying of the light source.

According to yet another aspect of the present invention, there is provided a system including a diffraction grating that diffracts light from a light source and a pair of spatial image sensors. The first of the pair of spatial image sensors is disposed to receive a direct transmission of focused, diffracted light corresponding to a zeroth diffraction order. The second of the pair of spatial image sensors is disposed to receive an indirect transmission of focused, diffracted light corresponding to a first diffraction peak. A lens focuses light diffracted by the diffraction grating into images on respective ones of the pair of spatial image sensors. A first image corresponds to the zeroth diffraction order being focused on the first spatial image sensor. The second image corresponds to the first diffraction peak being focused on the second spatial image sensor. A processor uses the images sensed by the spatial image sensors to classify the light source into one of a specified set of light source classes.

The foregoing and/or other aspects will become apparent from the following detailed description when considered in conjunction with the accompanying drawing figures

BRIEF DESCRIPTION OF THE DRAWINGS

The invention is herein described, by way of example only, with reference to the accompanying drawings, wherein:

FIG. 3 is a drawing illustrating a spectral camera, according to an embodiment of the present invention;

FIG. 3a is a graph of direct light transmission of a light source through the spectral camera of FIG. 3;

FIG. 3b is a graph of a diffracted spectrum of the light source through the spectral camera of FIG. 3;

DETAILED DESCRIPTION

Figure 1:
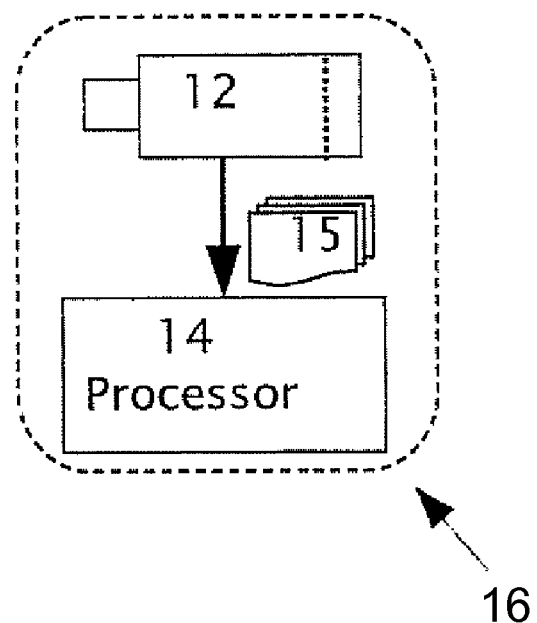
FIG. 1 is a drawing illustrating a conventional imaging system.
Figure 2:
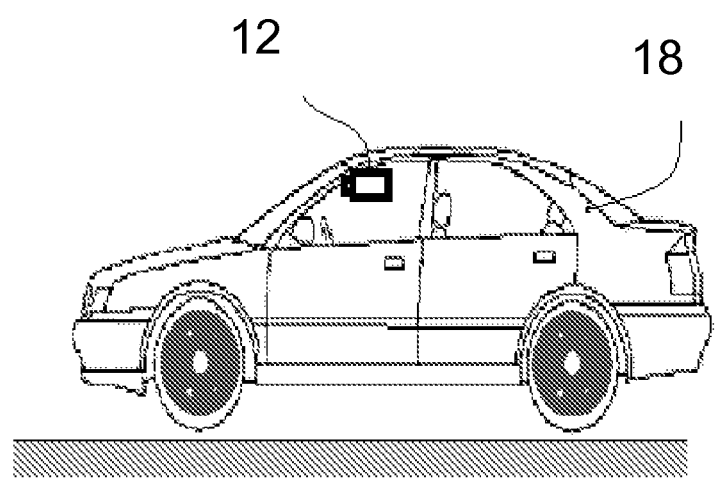
FIG. 2 is a drawing of a camera of the imaging system of FIG. 1 mounted in a vehicle.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The term "processor" is used herein may be a general purpose microprocessor, an application specific integrated circuit (ASIC), a system-on-chip (SoC), a field programmable gate array (FPGA) or any other electronic device known in the electronic arts, programmable or non-programmable.

The term "light source" as used herein refers to direct light sources, e.g. headlamps, streetlights and indirect light sources which do not actually source light but reflect light, such as ordinary traffic signs. The terms "light source" and "object" are used herein interchangeably.

The term "spectrum" as used herein refers a continuous electromagnetic ultraviolet/visible/near infrared spectrum as opposed to discrete spectral information as may be provided by one or more absorptive and/or dichroic color filters.

A "spectrum" is provided according to different embodiments of the present invention with use in the optical system of "dispersive" optical element which changes (on reflection or transmission) direction of optical rays dependent on wavelength (frequency or color) of electromagnetic radiation. A "diffraction grating" and a prism are examples of a "dispersive" optical element.

Although spectra of light sources in the embodiments presented is by diffraction using a diffraction grating, refraction such as by a glass prism may be similarly applied to provide a spectrum by one skilled in the art of optical design.

The term "vehicle" as used herein includes (but not limited to) in different embodiments of the present invention: an automobile, helicopter, plane, and boat. In some embodiments of the present invention, detection of lights, e.g headlamps, is performed in conjunction with other driver assistance systems being employed in the vehicle. As an example, the output of a detection system, according to an embodiment of the present invention may be used as an input for a traffic sign detection and recognition system and reduce the incidence of false (positive and/or negative) recognition of a traffic sign recognition system. A traffic sign recognition system is disclosed in co-pending EP application 07122458.8.

In an embodiment of the present invention headlight control according to US2007/0221822 may have an input from a system according to an embodiment of the present invention and take advantage of the various spectral characteristics of different light sources for improved light classification.

Although aspects of the present invention have been described for detecting and classifying lights in the vicinity of a vehicle, the principles of the present invention may be applied to other light sources, e.g., infrared other applications such as for military applications to identify the elements of interest, including search and rescue; location of armaments and troops, detecting atmospheric contaminants, such as poison gas; early warning missile detection systems; observation of submerged or buried mines or other impediments and tracking of supplies, as well as other applications including satellite topography.

Referring now to the drawings, FIG. 3 illustrates a spectral camera 22, in accordance with an embodiment of the present invention. Diffraction grating 30 diffracts light from light sources 80b, e.g. headlamps, taillights and streetlights, in the field of view of spectral camera 22. A lens 40 focuses light from light sources onto images on image sensor 50 in the focal plane of lens 40. A typical image sensor 50 is the Micron MT9V022 (Micron Technology Inc., Boise, Id. USA) which has 752×480 pixels and pixel size of 6 micrometer×6 micrometer. For convenience, a smaller region of image sensor 50 corresponding to a standard 640×480 (VGA) is optionally used. Lens 40 with a focal length of 4 mm. gives a 60 degree vertical field of view (VFOV) and 40 degree horizontal field of view (HFOV). The vertical field of view of lens 40 and the horizontal field of view of lens 40 are given by equations Eq.1 and Eq.2, respectively:

$$\alpha_v = 2\tan^{-1}(h/2f) \qquad \text{Eq. 1}$$

$$\alpha_h = 2\tan^{-1}(v/2f) \qquad \text{Eq. 2}$$

where f=focal length of lens 40=4 mm,
h=horizontal dimension of image sensor 50=752 pixels×6 micrometers=4.5 mm, and
v=vertical dimension of image sensor 50=480 pixels×6 micrometers=2.88 mm The use of a hood enclosure 20 prevents light from unwanted light sources such as 80a (for example, the sun) from entering spectral camera 22. For short lengths l of hood enclosure 20, the overall field of view of spectral camera 22 stays approximately the same as the 60 degrees field of view calculated for lens 40 using Equation 1. The use of hood enclosure 20 with a short length l of hood enclosure 20 improves contrast of the desired images and diffracted spectra. Increasing the length l of hood enclosure 20 reduces the overall field of view of spectral camera 22. The variation of dimensions in hood enclosure 20 allows for different vertical (y) and horizontal (x) fields of view for spectral camera 22 to be adjusted to accommodate various lens 40, diffraction grating 30 and image sensor 50 configurations (for example see FIGS. 4 and 5.). The variation of dimensions in hood enclosure 20 and various lens 40, diffraction grating 30 and image sensor 50 configurations can be selected to suit the type (height) of vehicle on which spectral camera 22 is mounted and the type of light sources to be detected and classified.

Consider a configuration where lens 40 and image sensor 50 provide a horizontal FOV of 60 degrees. Diffraction grating 30 is placed in front of lens 40 producing the first order spectrum at 18 degrees. Hood enclosure 20 (or baffle) restricts the FOV to around 18 degrees. This is a novel feature since a typical camera hood is specifically designed to be outside the FOV of the lens. With hood 20 in place, the only light hitting the outer regions of sensor 50 is first order diffracted light from light sources within the 18 degrees. The spectral image is not superimposed by direct light from sources outside the 18 degree FOV. Furthermore, the only light which reaches the central part of image sensor 50 is direct light from the source within the 18 degree FOV. Thus the central image is not superimposed by diffracted light from light sources outside the 18 degree FOV. With lens 40 of 40 degrees field of view, and hood 20 restricting the FOV to 18 degrees one first order spectral image is detected for each light source 80. With lens a 60 degree FOV both the + and − first order spectral images are detected.

The governing equation for diffraction grating 30 is $$\operatorname{Sin} A + \operatorname{Sin} B = 1 \times 10^{-6} \times (KnL) \qquad \text{Eq. 3}$$

where
A=angle of incidence (in degrees) of light source prior to entering grating 30,
B=angles of diffraction (in degrees) of incident light exiting diffraction grating 30,
K=integer number (+/−) orders of diffraction exiting diffraction grating 30,
n=the groove density of diffraction grating 30 in grooves per millimeter, and
L=wavelength in nano meters of light from light source 80b, the light entering diffraction grating 30.

Spectra of light emitted from light source 80b is provided at points 70a and 70b on image sensor 50 by angular dispersion which is the variation of the diffraction angle with wavelength and is defined as follows:

$$\frac{\partial B}{\partial \lambda} = \frac{Kn}{\cos(B)} \quad \text{Eq. 4}$$

In an exemplary embodiment of the present invention, light source 80b has a typical wavelength of 620 nano meters and an incident angle of zero degrees relative to the normal of diffraction grating 30. Diffraction grating 30 has a groove density n=500 lines per mm. The order K=0 corresponds to a direct transmission 60 of light source 80b through diffraction grating 30 with lens 40 focusing direct light transmission 60 onto the focal plane of lens 40 and image sensor 50. The order K=+/−1 corresponds to the diffraction of light source 80b through the diffraction grating 30 with lens 40 focusing in the focal plane of lens 40 diffracted spectra 70a and 70b onto image sensor 50. The diffracted angle B of spectra 70a and 70b being +/−17.5 degrees relative to the normal of diffraction grating 30 according to Eq. 3 for K=+/−1. FIGS. 3a and 3b show intensity graphs of the direct light image 60 and diffracted spectrum 70a respectively as a function of position across image sensor 50. A typical diffraction grating 30 is Holographic Diffraction Grating Film; Edmund Optics (Edmund Optics Inc, Barrington, N.J. USA) part number NT54-510 with 500 grooves/mm, 18 degrees diffraction angle, groove orientation linear. Grooves are placed horizontally parallel to the horizontal or x axis in spectral camera 22. The distance separating the peaks in of direct image 60 and diffracted spectra 70a and 70b are constant on image sensor 50. If lens 40 has a focal length of 4 mm and diffraction grating 30 has an 18 degrees diffraction angle the distance between the peaks of direct image 60 and diffracted spectra 70a on image sensor 50 is given by:

$$d = f \times \tan(B) \quad \text{Eq. 5}$$

where
d=distance between the peaks of direct image 60 and diffracted spectra 70a on image sensor 50,
f=focal length of lens 40=4 mm, and
B=diffraction angle of diffraction grating 30=18 degrees.

The above equation gives distance d between the peaks of direct image 60 and diffracted spectra 70a on image sensor 50 as 1.3 mm. If the pixel size of image sensor 50 is 6 micro meters by 6 micro meters, approximately 216 pixels distance is between direct image 60 and diffracted spectra 70a on image sensor 50. Similarly a 216 pixels distance is between direct image 60 and diffracted spectra 70b on image sensor 50 and 432 (two times 216) pixels separates diffracted spectra 70b and 70a on image sensor 50. An algorithm used for locating and classifying light sources 80b, e.g. headlights and taillights, in the field of view of spectral camera 22 can make use of the fixed distances between direct image 60 and diffracted spectra 70a and 70b on image sensor 50.

Light source 80b, e.g. headlights and/or taillights, produce diffracted spectra 70a and 70b on image sensor 50 which are typically dimmer than direct transmission 60. Image sensor 50 is optionally chosen which has different electronic gains, one gain for the region where diffracted spectra 70a, 70b fall onto image sensor 50 and another (lower) gain for the region where direct transmission 60 of light source 80b falls on image sensor 50.

Figure 4:
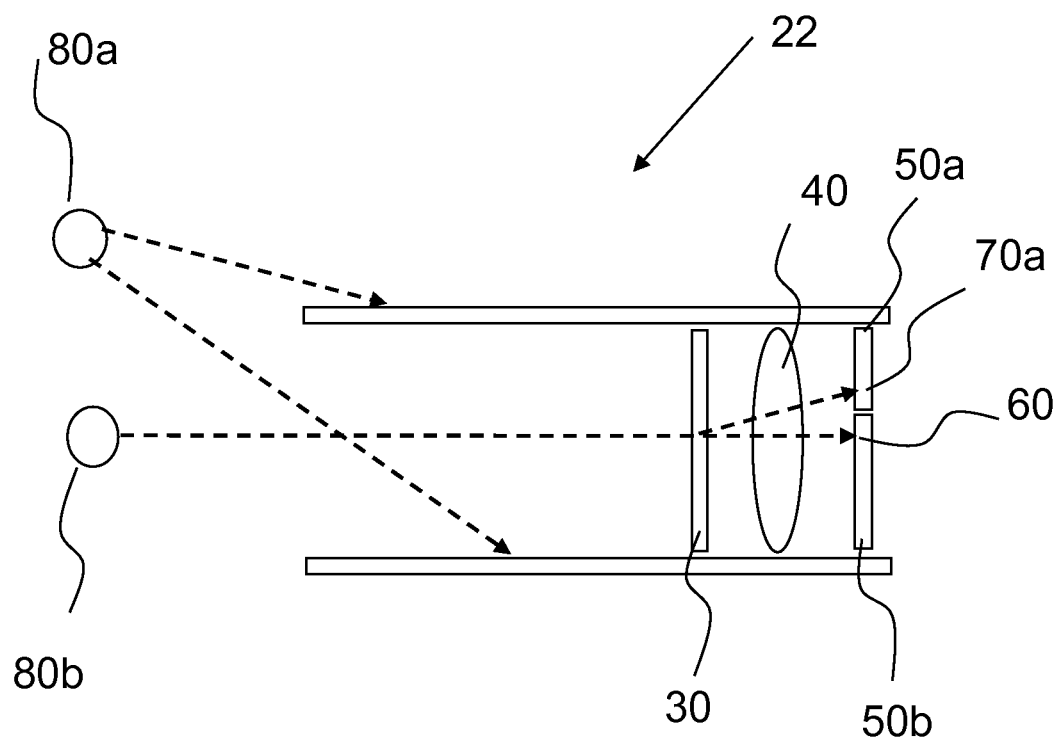
FIG. 4 is a illustrates a configuration of the spectral camera, according to another feature of the present invention, with two image sensors.

Reference is now made to FIG. 4, which illustrates another embodiment of spectral camera 22, in accordance with an embodiment of the present invention. Diffraction grating 30 diffracts light from light sources 80, e.g. headlights and taillights, in the field of view of spectral camera 22. Lens 40 focuses light from light sources onto images on different image sensors 50a and 50b both in the focal plane of lens 40. Direct transmission 60, corresponding to zeroth diffraction order is imaged by image sensor 50b and a first diffraction peak is imaged by image sensor 50a.

It is noteworthy that according to aspects of the present invention, the use of a dispersive optical element, e.g. diffraction grating 30, for producing a continuous spectrum, allows for the spectrum to be used in the near infrared region, greater than ~700 nanometer optical wavelength. The near infrared region is particularly useful in some driver assistance application such as pedestrian detection, lane detection and detection of halogen lamps.

Figure 5:
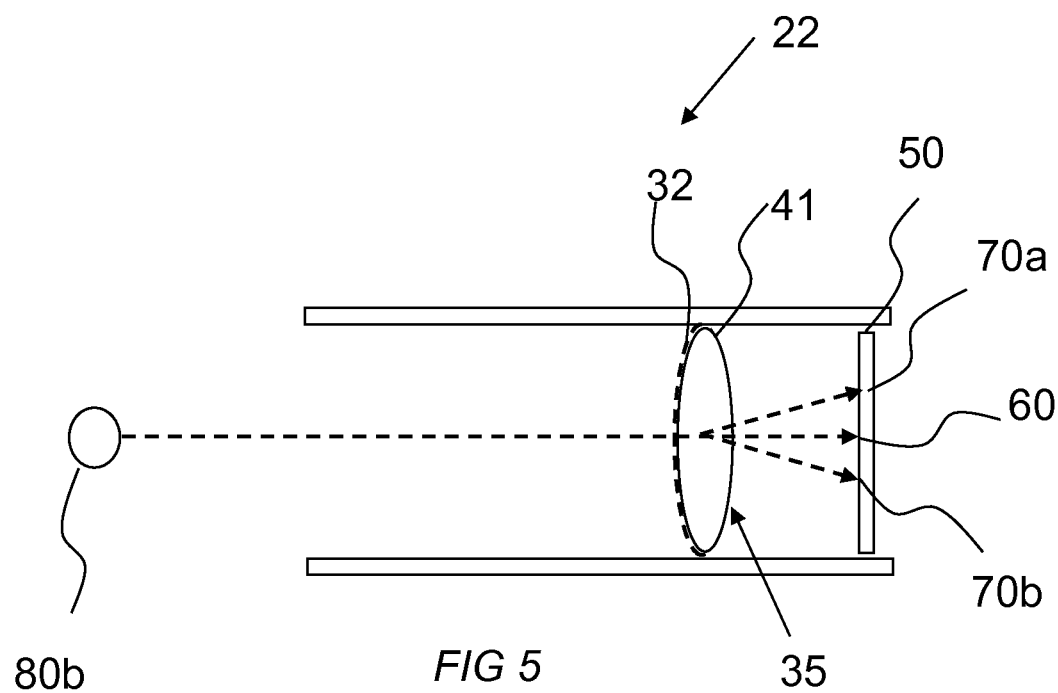
FIG. 5 is a drawing illustrating a spectral camera, according to another aspect of the present invention, in which the diffraction grating and the lens are integrated into a single optical element.

Reference is now made to FIG. 5, which illustrates yet another embodiment of spectral camera 22, in accordance with another aspect of the present invention. In FIG. 5, diffraction grating 32 is etched or ruled on the outer surface of at least a portion of the aperture of a lens 41, so that diffraction grating 32 and lens 41 are manufactured as a single optical element 35. Diffraction grating 32 diffracts light from light sources 80b, e.g. headlights and taillights, in the field of view of spectral camera 22. Lens 41 focuses light from light sources onto images on image sensors 50 in the focal plane of lens 41. Direct transmission 60, corresponding to zeroth diffraction order is imaged by image sensor 50 and first order diffraction peaks 70a and 70b are imaged onto image sensor 50. Single optical element 35 may have a diffraction grating 32 produced by a photo-lithographic process to produce holographic diffraction grating types such as plane diffraction gratings, convex diffraction gratings or concave diffraction gratings. Alternatively single optical element 35 may be a diffraction lens or even a zone plate.

Figures 5A, 5B, 5C:
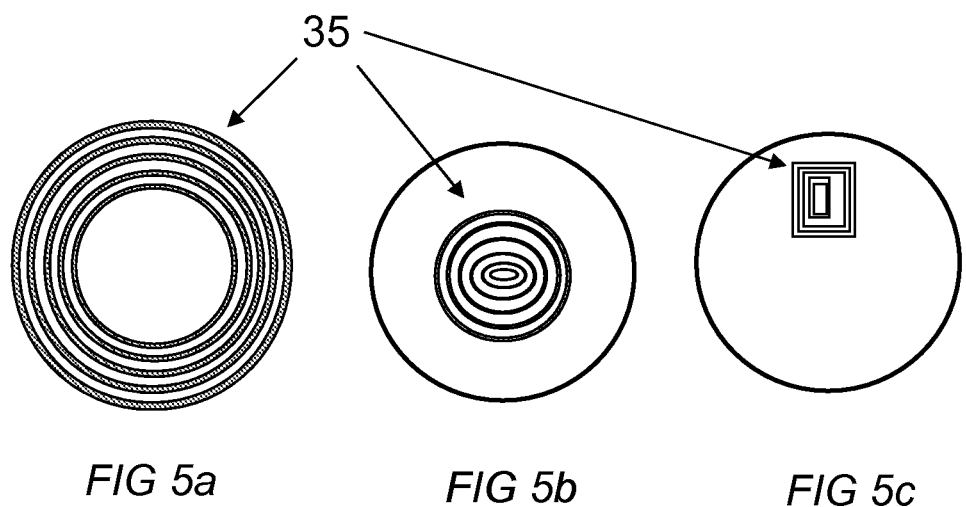
FIGS. 5a, 5b and 5c illustrate diffraction grating of different size and shape, according to different embodiments of the present invention, as viewed over the aperture the spectral camera along the optical axis of the spectral camera.

Reference is now made FIGS. 5a, 5b and 5c which illustrate diffraction gratings of different size and shape, according to different embodiments of the present invention, as viewed along the optical axis (z) of spectral camera 22. Diffraction grating 32 may include a portion of the aperture of the lens 40, 41 and a number of possibilities of shape and size of diffraction grating 32 for single optical element 35 are shown in FIGS. 5a, 5b and 5c.

According to different aspects of the present invention, the diffraction angle (or direction) may have a horizontal or vertical component (in the plane of image sensor 50). In a driver assistance application, a vertical component of the diffraction direction is typically desirable since most of lights 80 in the vehicle environment tend to be distributed horizontally below the horizon, a vertical component tends to position spectra 70 in direct image positions 60 corresponding to the sky. Consequently the chances of superimposition between spectra 70 and image spots 60 is reduced when there is a significant vertical component to the diffraction angle.

Figure 6:
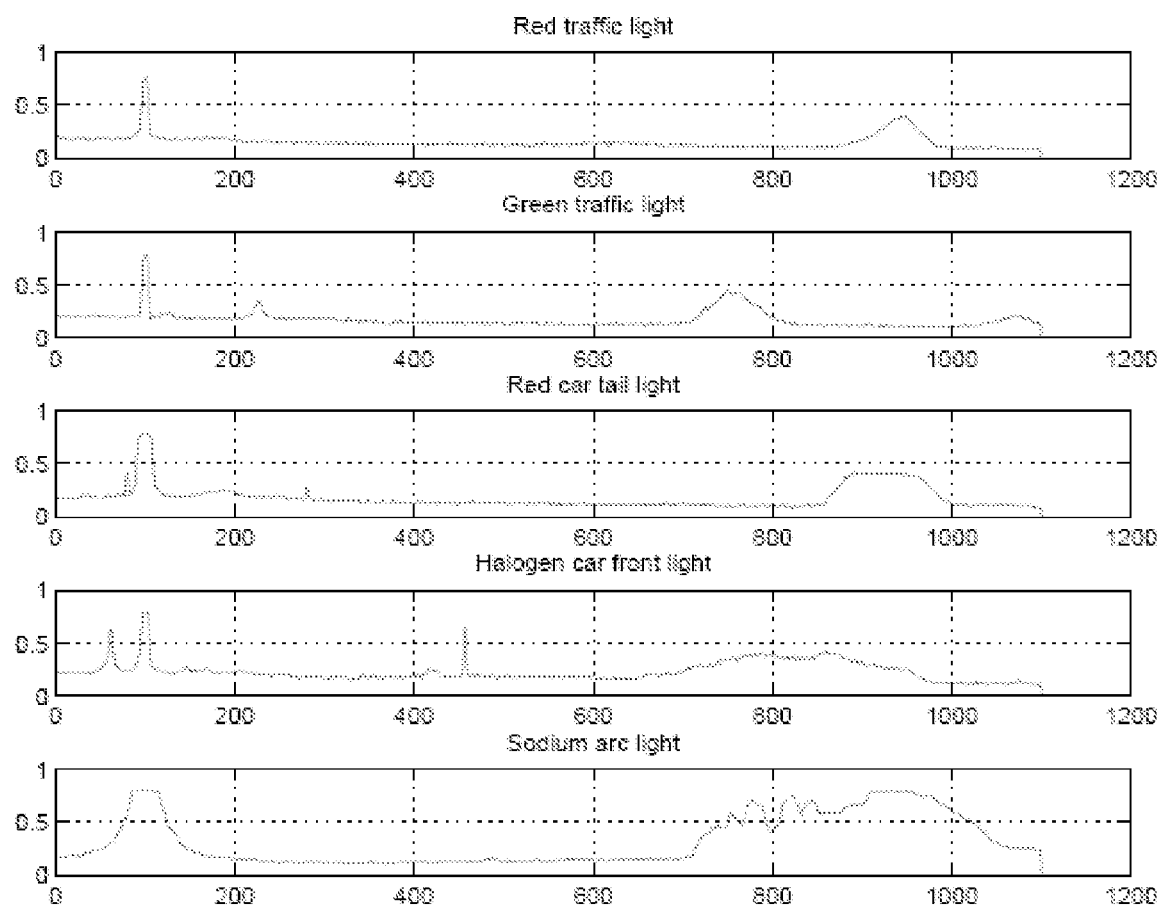
FIG. 6 illustrates graphs of typical spectra of different light sources found at roads in the vicinity of a motor vehicle.

Reference is now made to FIG. 6 which shows Cartesian graphs of spectra of various light sources found in typical road scenes as measured in spectral camera 20, 22. In the graphs of FIG. 6, the x-axes (abscissa) represent spectral wavelength (in arbitrary units) as measured along image sensor 50 and the y axes (ordinate) represent measured intensity (in arbitrary units) on image sensor 50. In the graphs of FIG. 6, direct transmissions 60 of the respective light sources 80, the spectra are aligned so that direct transmissions 60 are all at arbitrary unit 100 of the x-axes of FIG. 6. Although the wavelength units shown are uncalibrated and do not exactly correspond to wavelengths in nanometers, the characteristic troughs in the sodium arc light spectrum at 765 nm, 800 nm, and 835 nm are clearly seen. In one approach to light source classification with spectral camera 22, uses the particular spectral features such as the peaks and troughs in the spectrum to manually come up with rules to differentiate between the various light sources.

Figure 7:
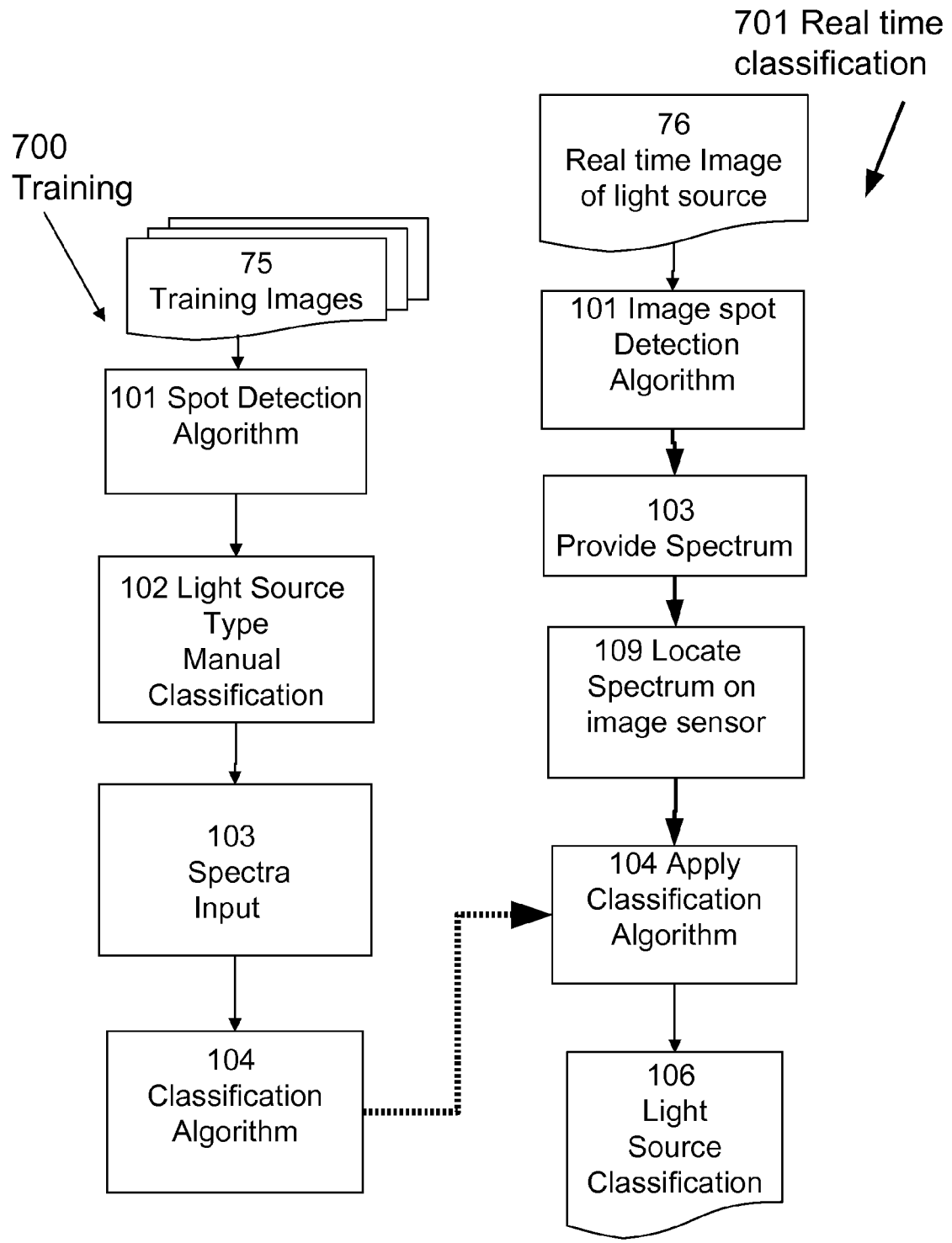
FIG. 7 is a flow diagram illustrating a method of classification of light sources, according to embodiments of the present invention.

Reference is now made to FIG. 7, which shows a flow diagram including a training process 700 a subsequent real time classification process 701 based on training process 700, according to an embodiment of the present invention. A typically large data base 75 is created with real world image examples of various light sources 80. A spot detection algorithm 101 is used to locate the direct transmission spots 60 as images of light sources 80. Spots 60 are classified (step 102), for instance manually, into the various known light-source types: halogen headlight, xenon, high intensity discharge (HID) headlights, sodium arc lights, fluorescent lights etc. Diffracted spectrum 70a, 70b is located above or below image spot 60. A region located for instance 100 pixels above the spot is used (step 103) as the input vector including the spectral data for the classifier, where W=11 and H=200, are the width and height respectively of the region measured in pixels. A classification algorithm 104 such as the Support Vector Machine (SVM) is trained on this input vector data. Since the SVM is a binary classifier the input data is preferably split into groups such as headlight or non-headlight. A second classifier 104 which distinguishes between taillight or non-taillight is optionally added. The above steps 101-104 are training steps and are performed "off-line". When the classification algorithm is fully trained (700), the same spot detection algorithm (step 101) is preferably used on a real time image 76. During "on-line" operation 701 the W×H region is located (step 109), to have the spectral data (step 103) of the image spot and input into trained classifiers 104. The result 106 of classification 701 is used for instance in an automatic headlight control as described in US 2007/0221822.

In preferred embodiments of the present invention, diffraction grating 30 is a blazed diffraction grating. Blazing diffraction grating 30, as well known in the optical arts, causes a specific spectral range of light source 80b to fall into one or a few diffraction orders. Blazed gratings are manufactured to produce maximum efficiency at designated wavelengths. A grating may, therefore, be specified as "blazed at 250 nm" or "blazed at 1 micron" etc. and manufactured according to known techniques with an appropriate design of groove geometry. In different embodiments of the present invention, diffraction grating 30 is blazed at or near spectral peaks of known light sources, e.g. headlights, taillights, expected to be found in the vicinity of motor vehicles.

In another embodiment of spectral camera 22, in accordance with the present invention a spectral camera 22 is bore sighted with a conventional camera 12. Spectral camera 22 and conventional camera 12 are placed next to each other to reduce parallax error. Conventional camera 12 is used to provide direct transmission or image spot 60 and spectral camera is used to provide diffracted spectra 70a and 70b. Prior to use spectra 70 and direct images 60 are calibrated such as with monochromatic light.

The definite articles "a", "an" is used herein, such as "a lens", "a sensor" have the meaning of "one or more" that is "one or more lenses" or "one or more sensors".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A system mountable in a vehicle, the system for classifying a light source, the system comprising:
    a spatial image sensor with a portion that defines a plane;
    a lens disposed between the light source and the spatial image sensor, that is adapted to provide an image of the light source on said spatial image sensor;
    a diffraction grating or prism disposed between said lens and said light source, that is adapted to direct a spectrum of the light source onto said spatial image sensor in a direction having a vertical component in the plane of said image sensor that tends to position said spectrum at a location on the spatial image sensor that corresponds to sky; and
    a processor operatively connectible to said spatial light sensor, wherein said processor is configured to locate said spectrum in the plane of said spatial image sensor and to use said spectrum to classify said light source as belonging to a class selected from a plurality of classes of light sources expected to be found in a vicinity of the vehicle.

2. The system according to claim 1, wherein said spectrum is sensed by said spatial image sensor.

3. The system according to claim 1, wherein the light source is selected from the group consisting of streetlights, headlights, taillights and traffic signs.

4. The system according to claim 1, further comprising a hood enclosure that is configured to limit a field of view so that an image of another light source does not superimpose said spectrum.

5. The system according to claim 1, wherein the processor uses both said image and said spectrum to classify said light source.

6. The system according to claim 1, wherein said image is not used in the classifying, wherein said image is usable for a driver assistance application.

7. The system according to claim 1, wherein said diffraction grating is a holographic diffraction grating.

8. The system according to claim 1, wherein said diffraction grating is a blazed diffraction grating.

9. The system according to claim 1, wherein said spatial image sensor has at least one programmable photosensitive gain region.

10. The system according to claim 1, further comprising a second spatial image sensor that detects said spectrum.

11. The system according to claim 1, further comprising a second spatial image sensor, wherein said spatial image sensor and said second spatial image sensor have different electronic gains.

12. The system according to claim 1, wherein said lens and said diffraction grating are formed in different optical surfaces of a single optical element.

13. The system of claim 1, wherein said image is usable for a driver assistance application and wherein said spectrum is used for classifying the light source by applying rules based on at least one known spectrum of the light sources expected to be found in the road environment.

14. A method of classifying light sources using a system including a camera equipped with a lens and a spatial image sensor, the method comprising:
    training at least one classifier based on a plurality of known spectra of light sources expected to be found in a vicinity of the system thereby producing at least one trained classifier;
    detecting an image of a light source on the spatial image sensor;

providing a spectrum of the light source at a direction having a vertical component in the plane of said image sensor that tends to position said spectrum at a location on the spatial image sensor that corresponds to sky;

locating said spectrum on the spatial image sensor on the plane of the spatial image sensor; and classifying the light source based on said spectrum as belonging to a class selected from a plurality of classes of the light sources, by applying said at least one trained classifier.

15. The method, according to claim 14, wherein said classifying is performed by applying rules based on at least one known spectrum of the light sources expected to be found in the vicinity of the system.

16. The method according to claim 14, wherein said at least one classifier includes a least one binary classifier.

17. The method according to claim 14, wherein said at least one classifier is based on support vector machines.

18. The method, according to claim 14, wherein said classifying is based on both said spectrum and said image.

19. The method, according to claim 14, wherein said spectrum is selectably produced by either a diffraction grating or a prism, disposed between said lens and said light source.

* * * * *